US012692170B2

(12) United States Patent
Wietelmann et al.

(10) Patent No.: US 12,692,170 B2
(45) Date of Patent: Jul. 28, 2026

(54) PROCESS FOR THE PREPARATION OF PURE LITHIUM OXIDE

(71) Applicant: ALBEMARLE GERMANY GMBH, Frankfurt am Main (DE)

(72) Inventors: Ulrich Wietelmann, Friedrichsdorf (DE); Ahmet Karaca, Goslar (DE); Johannes Klösener, Goslar (DE); Mary Schäder, Langelsheim (DE); Holger Schwerin, Goslar (DE); Henrike Rempel, Goslar (DE); Katrin Wessels, Hanover (DE); Rolf Sanders, Clausthal-Zellerfeld (DE); Alexander Hübner, Goslar (DE)

(73) Assignee: ALBEMARLE GERMANY GMBH, Charlotte, NC (US)

( * ) Notice: Subject to any disclaimer, the term of this patent is extended or adjusted under 35 U.S.C. 154(b) by 497 days.

(21) Appl. No.: 18/259,800

(22) PCT Filed: Jan. 3, 2022

(86) PCT No.: PCT/EP2022/050034

§ 371 (c)(1),
(2) Date: Jun. 29, 2023

(87) PCT Pub. No.: WO2022/152590

PCT Pub. Date: Jul. 21, 2022

(65) Prior Publication Data

US 2024/0059576 A1 Feb. 22, 2024

(30) Foreign Application Priority Data

Jan. 14, 2021 (DE) ..................... 10 2021 100 637.6

(51) Int. Cl.
*C01D 15/02* (2006.01)

(52) U.S. Cl.
CPC .......... *C01D 15/02* (2013.01); *C01P 2006/80* (2013.01)

(58) Field of Classification Search
None
See application file for complete search history.

(56) References Cited

U.S. PATENT DOCUMENTS

| | | | |
|---|---|---|---|
| 2019/0389734 A1 | 12/2019 | Dietz et al. | |
| 2020/0087155 A1 | 3/2020 | Rupert | |

FOREIGN PATENT DOCUMENTS

| | | | |
|---|---|---|---|
| JP | 2011209122 | A | 10/2011 |
| JP | 2012121780 | A | 6/2012 |
| JP | 2014017117 | A | 1/2014 |
| KR | 101957707 | B1 | 3/2019 |
| WO | 2018114760 | A1 | 6/2018 |

OTHER PUBLICATIONS

Takahashi, T., et al., Preparation and Characterization of Lithium Oxide, Fusion Engineering and Design 8 , 1989, pp. 399-405, Elsevier Science Publishers B.V., North-Holland, Amsterdam, all enclosed pages cited.

Kim, J., et al., Thermal and Carbothermic Decomposition of Na2CO3 and Li2CO3, Metallurgical and Materials Transactions B, Feb. 2001, pp. 17-24, vol. 32B, all enclosed pages cited.

Cabot Corporation, Elftex P100 Specialty Carbon Black, Cabot Specialty Carbon Blacks Marketing Materials, 2017, pp. 1-2, Billerica, Massachusetts, United States, all enclosed pages cited.

Cabot Corporation, Vulcan P Specialty Carbon Black, Cabot Specialty Carbon Blacks Marketing Materials, 2018, pp. 1-2, Billerica, Massachusetts, United States, all enclosed pages cited.

Tsukasaki, H., et al., Ionic Conductivity and Thermal Stability of Li2O—Li2S—P2S5 Oxysulfide Glass, Science Direct, 2020, pp. 1-6, Solid State Ionics, vol. 347, Elsevier B.V., all enclosed pages cited.

International Search Report and Written Opinion of PCT/EP2022/050034 mailed May 3, 2022, all enclosed pages cited.

International Preliminary Report on Patentability of PCT/EP2022/050034 mailed Jul. 4, 2023, all enclosed pages cited.

*Primary Examiner* — Yun Qian
(74) *Attorney, Agent, or Firm* — Nathan C. Dunn

(57) ABSTRACT

The invention relates to a process for the production of pure lithium oxide and its use, wherein lithium carbonate is reacted with finely divided, elemental carbon in powder form in the temperature range between 600 and 1200° C., wherein the two reactants are intensively premixed prior to the thermolysis process so that the bulk density of the mixture is reduced by at least 5%, preferably by at least 15%.

19 Claims, No Drawings

PROCESS FOR THE PREPARATION OF PURE LITHIUM OXIDE

The invention relates to an economical process for the production of pure lithium oxide in powder form and its use.

Lithium oxide is currently used as a raw material for the production of glasses, glass ceramics, ceramics and positive electrodes for lithium batteries. Furthermore, it can be used for the production of lithium hydroxide.

STATE OF THE ART

Lithium oxide can be produced by thermal decomposition of $Li_2CO_3$ at about 1000° C., i.e. of molten lithium carbonate, in platinum crucibles at a pressure of max. 267 Pa (2000 μm Hg) according to $$Li_2CO_3 \longrightarrow Li_2O + CO_2. \quad (1)$$

This method of manufacture produces the oxide in lumpy form, which must be ground before further use (D. S. Appleton, R. B. Poeppel in: Advances in Ceramics, Vol. 25, "Fabrication and properties of lithium ceramics," ed. I. J. Hastings and G. W. Hollenberg, 1989, 111-116). At a very low pressure of $<10^{-5}$ Torr, thermal decomposition can also occur below the $Li_2CO_3$ melting point of 720° C. (T. Takahashi, H. Watanabe, Fusion Eng. Design 8 (1989) 399-405). However, such low pressures are not economically achievable in technical devices.

It is also known to reduce lithium carbonate in the temperature range of 400-725° C. using hydrogen gas according to $$Li_2CO_3 + H_2 \longrightarrow Li_2O + H_2O + CO \quad (2)$$

(JP 2014047117 A). This process has safety-related disadvantages due to the use of explosive hydrogen gas at high temperatures.

Finally, carbon black can be used as a reducing agent for lithium carbonate (J.-W. Kim, H.-G. Lee, Metallurgical Mat. Trans. B, 32B (2001) 17-24). The carbothermic decomposition does not require a vacuum, but can be accomplished under Ar atmosphere at temperatures above about 720° C. according to the following reaction in alumina crucibles:

$$Li_2CO_3 + C \longrightarrow Li_2O + 2\ CO \quad (3)$$

A disadvantage is the strong corrosive effect of the carbonate melt on the aluminum oxide container material used. Carbothermal decomposition using coke, charcoal, activated carbon, sugar, synthetic graphite and similar materials can also be carried out at temperatures above 500° C. but below 720° C., i.e. avoiding the melting of lithium carbonate (JP 2012121780 A). In this case, relatively long reaction times must be expected. Similarly, lithium carbonate embedded in a polymer resin can be reduced to granular lithium oxide in the temperature range between 600 and 700° C. (JP 11209122 A). Disadvantages are the long reaction times of at least 6 hours and the fact that the oxide is obtained in granular form. For further use, e.g. as a raw material for the production of electrode materials for lithium batteries, the product must therefore be ground up beforehand.

WO 18114760 A1 also describes a process for the production of lithium oxide in powder form from lithium carbonate and elemental carbon or a carbon source forming elemental carbon under the reaction conditions in the temperature range from 720 to 1200° C., wherein the reaction takes place with the substantial exclusion of oxygen and wherein the reaction is carried out in containers whose surfaces in contact with the product consist of glassy carbon, lithium aluminate, ceramics coated with carbon or C-coated quartz glass or tantalum. In a preferred embodiment of the process, the reaction takes place in a fluidized bed or moving bed reactor, either under vacuum conditions (10-5000 Pa (0.1-50 mbar)) or in a gas atmosphere inert or substantially inert to carbon at pressures of about 50 to $2\times10^5$ Pa (0.5 to 2 bar), wherein nitrogen or noble gases (preferably argon) or mixtures of the inert gases being used as the inert gas atmosphere. A disadvantage of the process described in WO 18114760 A1 is that the reaction product $Li_2O$ is partly in caked form and contaminated with elemental carbon. As a rule, gray to black products are obtained which appear heterogeneous when viewed optically.

The present invention has set itself the object to provide a simple process using the basic raw material lithium carbonate, with the aid of which a free-flowing, lithium oxide in powder form can be produced in high purity, in particular a product contaminated with <0.2 wt. % of elemental carbon.

According to the invention, the object is solved by a process for the preparation of lithium oxide, in which lithium oxide is produced from lithium carbonate with a median particle size ($D_{50}$) between 2 and 150 μm, as determined by laser diffraction, and elemental carbon in powder form with a median primary particle size ($D_{50}$) of <1 μm, as determined by electron microscopy, with calcination in the temperature range between 600 and 1200° C., wherein the process is characterized in that prior to the calcination the lithium carbonate and the carbon are combined in a molar ratio of 1:0.1 to 1:1.2 and are mixed and compacted, whereby the carbon particles surround the lithium carbonate particles and form a coating and the bulk density of the resulting mixture is increased by at least 5% compared to the bulk density of a mixture of the lithium carbonate particles and the carbon particles prepared without compaction, the bulk density being determined according to EN ISO 697.

Accordingly, the lithium oxide is produced by a process in which lithium carbonate is reacted with finely divided powdery elemental carbon in the temperature range between 600 and 1200° C., the two reactants being intensively premixed with compaction prior to the thermolysis process so that the bulk density of this mixture is increased by at least 5%, preferably by at least 15%, compared with the bulk density of the two starting materials mixed without compaction. The bulk density without compaction of the two starting materials is determined by combining both raw materials in the desired molar ratio in a vessel and homogenizing them by a purely mechanical mixing process without the action of any appreciable mechanical pressure or significant shear forces. In this non-compacting mixing process, the energy input is $<2$ kWh/m$^3$. For practical measurement, for example, laboratory quantities (5-1000 mL) of the mixture are poured into a bottle of approximately twice the nominal volume and homogenized by prolonged shaking (at least 5 min) and/or on the roller stand by rotating the bottle over a period of several hours (e.g. 10 hours). The bulk density is determined according to the DIN ISO 697 standard.

The intensive mixing process according to the invention causes a deagglomeration of carbon agglomerates, i.e. a splitting into the individual primary particles and an efficient coating of the crystalline lithium carbonate. The spatially separated primary carbon particles are deposited on the surfaces of the larger lithium carbonate particles during mixing and coat them. The mixing process aims to achieve a homogeneous macroscopic distribution of the carbon particles in the mixture and a surface coating of the individual lithium carbonate particles that is as complete as possible. It is assumed that under intensive mixing conditions, the introduction of the small carbon particles (see below) into the pore volume and the interstices of the carbonate particles causes the observed increase in the bulk density of the mixture.

The direct contact of the particles consisting of elemental carbon with the lithium carbonate particles favors the mass transport and thus the reaction kinetics between the two components. Furthermore, it prevents the fusion of separated lithium carbonate particles when the melting temperature is exceeded.

Intensive mixing, i.e. deagglomeration and mixture compaction, can be achieved by the action of shear forces or by multi-stage compression/grinding processes.

It was surprisingly found that when using a compacted mixture of the two raw materials, in contrast to an uncompacted mixture as indicated in WO 18114760 A1, a lithium oxide end product with significantly improved homogeneity, purity and improved flowability can be obtained.

To achieve the desired deagglomeration of prilled carbon fractions and compaction during mixing, different equipment and process technologies can be applied. Grinding units, rotating intensive mixers or compacting devices are suitable. These include most types of mills, in particular rotor beater mills (impact mills), grinding media mills or pin mills; knife or cutting mills can also be used to a limited extent. In grinding media mills, mixing takes place in grinding drums using hard grinding media, such as balls, rods and the like consisting of metals (steels or nickel-based alloys) or hard ceramics (metal oxides, metal carbides, metal nitrides). The Vickers hardness of the grinding vessels and grinding media is at least 400, preferably at least 600. Materials made of stainless steels or metal oxides, for example aluminum oxide or zirconium oxide, are particularly preferred. Ball, rod or hammer mills can be used.

Furthermore, rotating mixers that produce an energy input in the range of about 10 to 500 $kW/m^3$ can be used. Among the rotating mixers, both those with rotating vessels and those with rotating mixing tools are suitable.

What is important is a sufficiently strong energy input causing the compaction. Such units, which can be designed according to the counterflow or crossflow principle, are offered, for example, by the Eirich company under the designation “intensive mixer”. Other suitable mixer designs are paddle dryers with additionally installed knife mills, such as those offered by the Lodige company, and intensive mixers with high-speed rotors, which are available, for example, from the Hosokawa company under the brand name “Nobilta”.

Furthermore, compacting machines, for example single- or multi-stage roller presses or roller mills, are suitable for compaction. In this case, the roll-compacted raw material mixtures are preferably granulated and/or ground in a second step. To achieve good deagglomeration and homogeneous distribution of the carbon particles, the compacting/grinding process is preferably run through several times (e.g. 2-10 times).

It is also possible to use unprilled (also referred to as “non-beaded” in German language) carbon black grades or to carry out the deagglomeration of the carbon products in a separate step (i.e. in the absence of lithium carbonate) and then to mix the deagglomerated process product with the lithium carbonate in a second step, thereby carbon coating and densifying it. Unprilled carbon blacks require special handling techniques for use on an industrial scale because they generally have low flowability and are highly dusty. It has been found that non-beaded carbon blacks, for example the product offered by company Cabot under the name “Vulkan P fluffy”, allow a faster and more complete conversion with lithium carbonate to lithium oxide. In particular, in the case where a $Li_2O$ end product with a particularly low combustible carbon content (i.e. TOC) is desired, such unprilled grades are used for the process according to the invention. The two-step process is capable of producing an equivalent mixture quality, but it is less preferred because of the higher equipment requirements and less favorable costs. In both cases, intensive mixing of the two components with appropriate compaction is necessary to achieve the desired advantages according to the invention.

In general, the energy input during mixing, for example the intensity of the shear forces, is such that no significant particle size reduction of the crystalline lithium carbonate particles occurs. Thus, the mixing energy input is usually only sufficient to break up the carbon particle agglomerates, which are held together by relatively weak Van-der-Waals forces, into the separated primary particles. However, if a relatively coarse-particle lithium carbonate grade (e.g. one with $D_{50}$>50 μm) is used and at the same time a particularly fine-particle lithium oxide (e.g. $D_{50}$ approx. 10-20 μm) is to be produced, it is also possible according to the invention to allow stronger shear forces to act on the mixture. Such higher shear forces occur, for example, in classifying mills, planetary ball mills or jet mills. These strongly grinding mixing processes are also according to the invention and are preferred over the grinding of the $Li_2O$ end product. Indeed, the advantage is that lithium carbonate is not hygroscopic and is resistant to air indefinitely. Therefore, the grinding process can be carried out under normal ambient air atmosphere. This is in contrast to the requirements for grinding lithium oxide. The oxide is extremely hygroscopic and reacts vigorously with $CO_2$. Therefore, oxide grinding requires the maintenance of strictly inert conditions, i.e. the exclusion of air and moisture, which is associated with a relatively high cost.

Pre-mixing can take place in a wide temperature range between about 0 and 500° C. Preferably, it is carried out at ambient temperatures without active heating or cooling. To avoid the risk of dust explosion, it is preferably carried out under inert conditions, i.e. in an oxygen-free or oxygen-poor atmosphere. Inert conditions can be achieved either by overflowing with an inert gas (noble gases or nitrogen) or under vacuum conditions. Preferably, the oxygen content in the mixing unit used is <12 vol. %, preferably <5 vol. %.

The subsequent thermally induced conversion (the calcination) is carried out in equipment whose product-facing surfaces are made of materials resistant to high temperatures and corrosion from basic lithium salts. In contrast to the teaching established in WO 18114760 A1 that metallic materials, with the exception of tantalum, are generally not usable, it has been found that a variety of metallic materials selected from high temperature resistant Cr- and/or Al-containing materials are usable. In particular, Cr- and/or Al-containing nickel-base alloys, Ni and Cr-containing austenitic steels as well as low-Ni or Ni-free, Cr- and Al-containing ferritic steels and chromium-containing mixed austenitic-ferritic steels can be used as container material for the conversion of the mixtures of elemental carbon and lithium carbonate compacted according to the invention into pure lithium oxide. The chromium content of the alloys suitable for use is at least 15 wt. %, preferably at least 20 wt. % and particularly preferably at least 30 wt. %. In the case of Al contents of at least 1 wt. %, the chromium content can be selected to be significantly lower (at least 5 wt. %). The preferred Al content is at least 1 wt. %, particularly preferably at least 2 wt. %. In addition to chromium and aluminum, the metallic material alloys which can be used for the process according to the invention may contain the elements niobium, titanium, tantalum and/or silicon, in each case in proportions of up to 10 wt. %. Preferably, low-Mo alloys are used. The Mo content is below <2 wt. %, preferably <1 wt. %.

The following commercially available metallic materials are particularly advantageous to use:

Ni-base alloys: Inconel 600, Inconel 601, Inconel 693, Inconel 702, Inconel 800, Inconel 825; Incoloy 901, Nichrome, Nichrome V, Nimonic 75, Nimonic 80A, Nimonic 90, RA602CA/Alloy 602 CA, Alloy X and comparable grades;

Austenitic steels: SS347 (1.4550), 253MA (1.4835), Nitronic 50, 310S, 316L, SS310, SS304, RA253MA and similar;

Ferritic steels: Kanthal (e.g. Kanthal A1, Kanthal A F, Kanthal D (FeCrA1)), PM 2000, Incoloy MA 956 and similar.

Solid metallic materials selected from the material groups mentioned as well as correspondingly coated high-temperature resistant black or stainless steels can be used. The corrosion-inhibiting coating on the product-facing side contains at least 10% by weight, preferably at least 30% by weight, of chromium. Furthermore, it can contain the elements Ni, Fe, Nb, Al, Ti, Ta and Si in contents of max. 10 wt. % each.

The thickness of the chromium-containing, corrosion-preventive coating is at least 5 μm, preferably at least 10 μm. The coating thickness is determined by electron microscopy. For example, an only moderately corrosion-resistant austenitic steel such as 1.4401 can be significantly improved in terms of its corrosion resistance by applying a 50 μm thick Cr- and Al-containing coating. Such a coating process can be accomplished via various electrochemical or physical technologies, for example a pack-cementation process (Kim, Mater. Transact. 43, 2002, 593).

In addition to the metallic materials mentioned, also carbon-based materials, certain oxide ceramics (e.g. $Al_2O_3$, lithium aluminate ceramics ($LiAlO_2$) or Ce-based ceramics, e.g. Ce-stabilized $ZrO_2$) and non-oxide ceramics (e.g. carbides such as SiC, BC, TiC; nitrides such as TiN, AlN and borides such as $NbB_2$, BN, Al-infiltrated $TiB_2$, "TiBAl") can be used as container materials. Materials coated with the above-mentioned ceramics (preferably $LiAlO_2$), for example high-temperature resistant steels, can also be used. As carbon-based materials, material graphites (carbon graphites, hard carbons) and in particular pure carbons with a disordered graphite structure and ceramic property profile (glass carbons) can be used. However, the use of carbon-based materials in high-temperature calcination processes, i.e. processes at temperatures >approx. 400° C., requires particularly strictly controlled inert conditions, i.e. the complete exclusion of oxidizing agents such as oxygen or other oxygen donors such as water or $CO_2$. Particularly preferred is the use of oxidation-stabilized graphite materials, which show significantly lower burnup rates than high-purity graphite when in contact with ambient air. (D. V. Savchenko, New Carbon Materials 2012, 27, 12-18). Graphite materials are high-temperature resistant materials produced via a filler/binder system from raw materials such as petroleum cokes, pitch cokes, carbon blacks, and graphites. They are first ground to defined particle size distributions, mixed at elevated temperature, shaped and compacted into green bodies in presses, and then carbonized by a high-temperature pyrolysis process.

The carbon-based materials can be used as solid reaction vessels, or hollow bodies coated or lined with graphitic material (e.g., metal tubes lined with graphite foil) can be used.

The carbothermal conversion of the elemental carbon coated lithium carbonate to lithium oxide takes place under conditions that ensure the effective removal of the carbon monoxide by-product formed during the reaction. Preferably, the reaction is carried out under reduced pressure, e.g. "technical vacuum" (i.e. a negative pressure in the range of about 0.01 to 50 mbar (1 to 5000 Pa)). It is also possible to work under overflow conditions, in which case the overflowing gas or gas mixture must be inert or substantially inert with respect to carbon, even at high temperatures of >600° C. Preferably, nitrogen or a noble gas (preferably argon) can be used as such an inert gas, or mixtures of inert gases can be used. The inert gases must have a high degree of purity with respect to contamination with water and oxygen. The latter two substances must generally not exceed a content of approx. 0.1% by volume.

To achieve a reaction rate that is also satisfactory from a commercial point of view, a temperature range between 600 and 1200° C. is selected. Depending on the selected temperature, the duration of calcination is generally between 5 minutes and 48 hours, for example at 900° C. preferably 10 to 300 minutes. A particularly preferred process variant consists of maintaining a specific temperature profile which includes a reaction phase below the melting temperature of lithium carbonate (approx. 720° C.) and a second phase above 720° C. during which the conversion to lithium oxide is completed. In the first reaction phase, with a residence time between about 1 and 120 minutes, the mixture is calcined in the temperature range between 600 and 700° C. This is followed by a reaction phase with further increased product temperature, during which the conversion to the oxide is completed. This second phase in the temperature range 700 to 1200° C. lasts between 10 hours and 5 minutes, depending on the selected product temperature. Product temperatures between 800 and 950° C. are particularly preferred, with corresponding residence times between 2 hours and 10 minutes. Surprisingly, it was found that the lithium oxide produced in this way neither sintered nor clumped during the high-temperature phase.

Elemental carbon is used in powder form, consisting of particles with high surface-to-volume ratios. Preferably, powdery industrial carbon blacks, graphites, activated carbons or graphemes are used. Elemental carbon is used in a lithium carbonate to carbon molar ratio in the range of 1:0.1 to 1:1.2, preferably in the range of 1:0.6 to 1:1.1. Preferably, C-raw materials with a high specific surface area (10 to 1500 $m^2/g$, preferably 20-200 $m^2/g$, determined by the BET method) and with a very small primary particle size are used. The specific surface area is measured by gas adsorption, a method known as "BET measurement", named after the developers Stephen Brunauer, Paul Hugh Emmett and Edward Teller, according to the standard specification ASTM D6556. Primary particle sizes and agglomerate contents are determined by electron microscopy (morphological determination method using electron microscopy ASTM D 3849). Particle size determinations by laser diffraction according to ISO standard 13320 (issue date 2020-01) would also be possible, but they do not allow primary and agglomerate particles to be distinguished. The median primary particle sizes $D_{50}$ determined according to ASTM D3849 are <1 μm, but preferably carbons with median primary particle sizes $D_{50}$<100 nm, most preferably <50 nm are used. The median value $D_{50}$ indicates the particle size below or above which 50 wt. % of the respective amount type lies, based on the total mass of all particles.

Finely divided carbon powders are offered by various companies for applications as fillers, colorants or as conductive carbon blacks, the latter for improving electrical conductivity. Many commercially used carbon grades, especially carbon blacks, contain larger amounts of agglomerates. These agglomerates improve the flowability of finely divided carbons and are produced by the carbon black producers by prilling.

The carbon powders used are of high purity, that is, they have low sulfur contents of <1000 ppm, preferably <500 ppm, and low residual ash contents of <1000 ppm, preferably <500 ppm. The sulfur content is determined by atomic emission spectroscopy, for example with inductively coupled plasma (ICP-OES). The residual ash content is determined in accordance with the DIN EN 15403 standard.

For example, high-purity conductive carbon blacks with typical BET surface areas between 20 and 80 $m^2/g$, marketed for example under the brand names TIMCAL C45, C-NERGY Super C65 or Super P-Li by the company Timcal Graphite & Carbon, can be used. Suitable industrial carbon blacks with high purity are offered, for example, by the company Cabot under the brand names ELFTEX 254, ELFTEX TP or ELFTEX P 100.

The lithium carbonate has average particle sizes $D_{50}$ between 2 and 150 μm, preferably 10 to 80 μm (measurement by laser diffraction method, for example with the device "Mastersizer 3000" from Malvern Pananalytical). For applications of the $Li_2O$ end product for the production of materials for energy storage technology, high purities are generally required. Consequently, pure lithium carbonate is used for this purpose, for example commercially under the name "battery grade". This product grade has, for example, sodium contents of no more than 500 ppm and total heavy metal contents of at maximum 100 ppm. The impurities are generally measured by atomic emission spectroscopy, for example ICP-OES, or for elements that show low detection sensitivity in atomic emission spectroscopy (applies to Na, for example) by atomic absorption spectroscopy (AAS).

In order to be able to achieve a coating of the crystalline lithium carbonate particles with the primary carbon particles as uniform as possible during the intensive mixing pretreatment, it is necessary for the carbon particles to have significantly smaller particle diameters ($D_{50}$) compared with the lithium carbonate crystals. In general, the ratio of the particle sizes $D_{50}$ of carbon to $Li_2CO_3$ is in the range of 1:50 to 1:20,000, preferably 1:100 to 1:10,000.

In the spirit of the invention, it is also possible to produce the finely divided carbon required for the carbothermic reaction by an upstream pyrolysis reaction using organic, low-ash (max. ash content 0.1 wt. %) organic compounds in the presence of the lithium carbonate and then to compact/compress this mixture according to the above-described process and then to convert it into lithium oxide by means of calcination at 600-1200° C. In this process, the lithium carbonate is pre-mixed with a suitable organic material (e.g. sugar, cellulose, edible oils and the like) and pyrolyzed in the absence of oxygen and at temperatures between 200 and 600° C. The volatile components and pyrolysis gases are discharged via a valve system into a waste gas treatment plant. The residue remaining, consisting of elemental carbon and lithium carbonate in the preferred molar ratio of 0.6-1.2:1, is then compacted by at least 5%, preferably at least 15%, in a mill or compaction plant and then pyrolyzed according to the invention.

In the simplest case, the pyrolytic conversion to lithium oxide can be carried out under static conditions, i.e., unstirred and unmoved. Preferably, however, it is carried out under moving bed conditions. For the moving bed technology, reactors with fluidized or floating bed technology, as well as fluidized bed reactors (for example, rotary or pendulum tubes) are used. For this purpose, the reaction mixture is brought to the required temperature in a moving bed reactor and converted to the product lithium oxide with removal of the CO-containing exhaust-gas stream. Production in the moving-bed reactor is preferably not carried out in batches, but with continuous raw material feed and correspondingly continuous reaction and product discharge.

Depending on the reaction conditions, a proportion of elemental carbon may remain in the calcined product. In order to reduce or completely eliminate this residual C content, which is undesirable for certain applications, a purification step can be carried out downstream of the synthesis reaction. For this purification process, oxygen-containing gases or gas mixtures (decarbonization gases) selected from $O_2$, $CO_2$ and $H_2O$, possibly diluted with further gases inert to carbon such as nitrogen or noble gases, are used. The purification process can take place either in the same device where the carbothermic $Li_2O$ formation has taken place or in a second device separated therefrom. Purification, like synthesis, requires high temperatures, generally at least 300° C., preferably at least 600° C., and particularly preferably at least 700° C. The materials that can be used as container materials for this step are selected from high-temperature metallic alloys, ceramics or inorganic glasses. Carbon-based materials such as glassy carbon, material graphites and the like cannot be used at temperatures above about 600° C. because they can be attacked by the decarbonization gases and converted to the gaseous state. During the conversion of the C-containing lithium oxide, the following carbon gasifying reactions take place:

$$C + O_2 \longrightarrow CO_2 \tag{4}$$

$$C + CO_2 \longrightarrow 2\ CO \tag{5}$$

$$C + H_2O \longrightarrow CO + H_2 \tag{6}$$

In order to avoid a back reaction of the formed C-containing gases (CO and $CO_2$) with the $Li_2O$ as far as possible, the reaction gases must be removed as efficiently as possible. This is done by simultaneously introducing an inert carrier gas, either as a separate gas stream or preferably as a mixture with the O-containing decarbonization gas. Air is preferably used for decarbonization, the oxygen content of which can, if necessary, be diluted to a proportion of <10 vol. % by admixing nitrogen. Furthermore, nitrogen or argon with a moisture content corresponding to their $H_2O$ saturation concentration in the temperature range between 0 and 400° C. is a preferred decarbonization agent. The overflow velocity with the decarbonization gas or gas mixture is generally between 0.1 to 10 cm/s.

The pure lithium oxide according to the invention can be used for the production of cathode materials (positive electrode materials) for lithium batteries as well as for the production of glasses, glass ceramics or crystalline ceramics. Particularly preferred, the pure lithium oxide produced by the process according to the invention is used for the production of lithium-rich nickel compounds such as $Li_2NiO_2$ (G. Cedar, Chem. Mater. 2004, 2685) or for the production of lithium-conductive glasses, glass ceramics or ceramics such as LLZO (lithium lanthanum zirconia with garnet structure) or oxygen-stabilized thiophosphate compounds (H. Tsukasaki, Solid State Ionics 347, 2020, 115267) or Li-containing argyrodites (e.g. $Li_6PS_4OCl$, US 2020/0087155).

EXAMPLES

The following examples are intended to explain the process according to the invention without suggesting any limitations.

The analytical characterization of the $Li_2O$ reaction product is performed by the following methods:

- Determination of $Li_2O$ content: acidimetric titration
- Metallic impurities: ICP-OES (atomic emission spectroscopy)
- Carbon content: the contents of inorganic C (carbonate, “TIC”) and elemental/organic C (“TOC”) are determined using equipment from Seifert Instruments (C/S-Max). For TIC determination, the sample is decomposed using dilute phosphoric acid and the resulting $CO_2$ is determined by carrier gas flow in an IR detector. For TOC determination, the sample is burned at 1350° C. in an $O_2$ stream and the resulting $CO_2$ is also detected by IR.

Example 1 (Mixing Using Beaded Carbon Black Under Compacting Conditions Followed by Calcinations Under Vacuum Conditions or in a Nitrogen Stream 1.1 Mixing:

618 g lithium carbonate powder, battery grade (bulk density 650 g/L; $D_{50}$=26 μm) and 100.4 g carbon black (ELFTEX TP from Cabot, bulk density 370 g/L, primary particle size $D_{50}$=<25 nm) as well as 2 agate spheres with 50 mm diameter and 10 agate spheres with 20 mm are weighed into 3-L PE bottles with screw caps. The raw material weights correspond to a stoichiometric ratio $Li_2CO_3$:C of 1:1. After screwing the bottle, its contents are homogenized on a roller stand for 9 hours. Afterwards, the spheres are separated by sieving.

Weighing: 716 g black mixture, bulk density 0.67 g/mL 1.2 Calcination Under Vacuum Conditions:

20.0 g of the compacted $Li_2CO_3$/C mixture are placed in a stainless steel crucible lined with a lithium aluminate layer. The crucible is placed in a tubular furnace with a stainless steel tube and heated to a product temperature of 900° C. under vacuum conditions (20 mbar (2000 Pa)). After three hours of thermolysis at the specified temperature, cooling is performed. The crucible is placed in an Ar-filled glove box and the homogeneous, barely caked material with a light gray color is transferred to a glass bottle. When sieved through a 1 mm sieve and transferred, the slightly caked portions disintegrated to a powder.

Yield: 6.5 g (95% d. Th).

Analytics:

Total Inorganic Carbon (TIC)=0.2%.
Total Organic Carbon (TOC)=0.1%
Fe (ICP-OES)=60 ppm
Content $Li_2O$ (titrimetric)=98%.

1.3 Calcination in the Nitrogen Stream:

10.0 g of the compacted $Li_2CO_3$/C mixture from 1.1 are placed in an alumina crucible. The crucible is placed in a tubular furnace with a quartz tube and heated to a product temperature of 900° C. under nitrogen flow (40 L/h). A CO-sensitive gas sensor was used to measure the CO concentration in the gas effluent. Initially, the CO detector showed CO concentrations of >2000 ppm (maximum measurable concentration). After 6.5 hours of thermolysis at the specified temperature, CO was no longer detectable (<3 ppm) and it is cooled down. The crucible is transferred into an Ar-filled glove box using an intertized transport vessel and the homogeneous, barely caked and slightly gray material is transferred into a glass bottle. On sieving through a 1 mm sieve and transferring, the slightly caked portions disintegrated to a powder.

Yield: 3.2 g (92% d. Th).

Analytics:

Total Inorganic Carbon (TIC)=0.14%.
Total Organic Carbon (TOC)=0.14%.

Example 2 (Comparative Example According to WO 18114760 A1, (Mixing of Beaded Carbon Black Under Non-Compacting Conditions and Subsequent Calcination))

2.1 Mixing:

620 g of lithium carbonate powder, battery grade, and 100.6 g of carbon black (ELFTEX TP from the Cabot company) are weighed into 3-L PE bottles with screw caps. These are the same materials as used in Example 1.1. The raw material weights correspond to a stoichiometric ratio $Li_2CO_3$:C of 1:1. After screwing the bottle, its contents are homogenized on a roller stand for 9 hours.

Weighing: 717 g black mixture, bulk density 0.58 g/mL 2.2 Calcination:

20.0 g of the non-compacted $Li_2CO_3$/C mixture is placed in a stainless steel crucible lined with a lithium aluminate layer. The crucible is placed in a tubular furnace with a stainless steel tube and heated to a product temperature of 900° C. under vacuum conditions (20 mbar (2000 Pa)). After three hours of thermolysis at the specified temperature, cooling is performed. The crucible is placed in an Ar-filled glove box and the heterogeneous appearing, partially caked material with a gray coloration is removed from lumpy portions via a 1-mm sieve and transferred to a glass bottle.

Yield: 6.1 g (88% of Th). (0.6 g with >1 mm were obtained as sieve residue).

Analytics:

Total Inorganic Carbon (TIC)=0.8%.
Total Organic Carbon (TOC)=0.6%.
Fe (ICP)=160 ppm
Content $Li_2O$ (titrimetric)=98%.

Example 3 (TOC-Reducing Post-Purification Using Oxygen)

In an Ar-filled glove box, 7.9 g $Li_2O$ with a TOC content of 1.3% and a TIC content of 0.19% were added to a ceramic crucible (pure $Al_2O_3$). The crucible was placed in a tubular furnace with a quartz tube, diameter 40 mm, under exclusion of air and heated to a process temperature of 800° C. under a nitrogen flow of about 400 L/h. After reaching the target temperature, ambient air was added to the gas flow several times at a rate of about 10-40% for a period of 30-60 s. The sample began to decolorize after the first contact with air-containing overflow gas. The admixture of air was repeated until no more CO was detected in the exhaust gas. The system was then switched to pure nitrogen and calcined for a further 30 min. Then cooling was performed under nitrogen flow and the crucible was emptied in the glove box.

Yield: 6.7 g colorless, slightly agglomerated product

Analytics:

TOC<50 ppm (detection limit!)

TIC=0.18%

Example 4 (TOC-Reducing Post-Purification by Means of Water Vapor)

In an Ar-filled glove box, 8.3 g $Li_2O$ with a TOC content of 1.3% and a TIC content of 0.19% were added to a ceramic crucible (pure $Al_2O_3$). The crucible was placed under air exclusion in a tubular furnace with a quartz tube, diameter 40 mm, where it was heated to a process temperature of 900° C. under a nitrogen flow rate of 400 L/h. After reaching the target temperature, moisture was added to the gas flow. This was done by passing the $N_2$ gas stream through a Woulf's bottle filled with water. The sample immediately began to decolorize. The gas stream containing air moisture was maintained for 1-2 hours. Then, it was switched again to pure nitrogen and calcined for another 30 min. Finally, cooling was performed under nitrogen flow and the crucible was emptied in the glove box.

Yield: 6.9 g white, partially agglomerated product

Analytics:

TOC 350 ppm

TIC=0.023%

Example 5 (Use of Non-Beaded Carbon Black, Mixing Under Compacting Conditions and Subsequent Calcination in a Nitrogen Stream)

5.1 Mixing:

In 3-L PE bottles with screw caps, 350 g of lithium carbonate powder, battery grade (bulk density 650 g/L; $D_{50}$=26 μm) and 56.8 g of carbon black (Vulcan P fluffy from Cabot Company, bulk density 220 g/L, primary particle size $D_{50}$=<25 nm) and 2 agate spheres with 50 mm diameter and 10 agate spheres with 20 mm are weighed. The raw material weights correspond to a stoichiometric ratio $Li_2CO_3$:C of 1:1. After screwing the bottle, its contents are homogenized on a roller stand for 9 hours. Afterwards the spheres are separated by sieving.

Weighing: 395 g black mixture, bulk density 0.63 g/mL.

5.2 Calcination in a Nitrogen Stream:

10.0 g of the compressed $Li_2CO_3$/C mixture from 5.1 are placed in an alumina crucible. The crucible is placed in a tubular furnace with a quartz tube and heated to a product temperature of 900° C. under nitrogen flow (40 L/h). A CO-sensitive gas sensor was used to measure the CO concentration in the gas discharge. Initially, the CO detector showed CO concentrations in the range of >2000 ppm. After 3 hours of thermolysis at the specified temperature, the CO content had dropped to <3 ppm and cooling is performed. The crucible is transferred into an Ar-filled glove box using an intertized transport vessel, and the homogeneous, barely caked snow-white material is transferred into a glass bottle. On sieving through a 1 mm sieve and transferring, the slightly caked portions disintegrated to a powder.

Yield: 3.3 g (95% d. Th).

Analytics:

Total Inorganic Carbon (TIC)=0.10%.

Total Organic Carbon (TOC)=0.01%.

Examples 1 and 2 show the influence of the different mixing processes on the bulk density of the raw material mixture and on the quality of the final product $Li_2O$.

The compacting mixing process in Example 1 increases the bulk density of the $Li_2CO_3$/C mixture from 0.58 g/mL (Comparative Example 2, without the action of any pressure or appreciable shear forces) to 0.67 g/mL. This corresponds to a compaction of 16%. When using non-beaded carbon black in Example 5.1, a compaction of 26% is observed compared to the sum of the volumes of carbon black and lithium carbonate used.

When calcined under vacuum conditions, the compacted raw material mixture of Example 1 results in a less agglomerated product with significantly reduced TOC and TIC contents.

Experiments 3 and 4 describe two possible post-purification processes, in particular the decomposition of elemental carbon by reaction with oxygen (air) and water vapor, respectively.

By post-combustion using the oxygen contained in the air, the TOC can be reduced to below the analytical detection limit of 50 ppm (Example 3). In example 4, the C content is reduced from 1.3 wt. % to 230 ppm.

A comparison of the calcination results of Examples 1.3 and 5.2 shows the advantages of using non-beaded carbon blacks ("fluffy grades"). While the use of beaded carbon black with the same primary particle size of <25 nm requires 6.5 hours for the CO evolution to decay, this time is reduced to 3 hours when using the non-beaded carbon black "Vulkan P fluffy". In addition, the combustible carbon (TOC) content is significantly lower when using "Vulkan P fluffy" (0.01 versus 0.14%).

The invention claimed is:

1. A process for the production of lithium oxide from lithium carbonate with a median particle size ($D_{50}$) between 2 and 150 μm, determined by laser diffraction, and elemental carbon in powder form with a median primary particle size ($D_{50}$) of <1 μm, determined by electron microscopy, with calcination in a temperature range between 60° and 1200° C., characterized in that prior to the calcination the lithium carbonate and the carbon are combined in a molar ratio of 1:0.1 to 1:1.2 and are mixed and compacted, whereby the carbon particles surround the lithium carbonate particles and form a coating and a bulk density of a resulting mixture is increased by at least 5% compared to a bulk density of a mixture of the lithium carbonate particles and the carbon particles prepared without compaction, the bulk density being determined according to EN ISO 697.

2. The process according to claim 1, characterized in that the bulk density of the compacted mixture is increased by at least 15% compared to the bulk density of an uncompacted mixture.

3. The process according to claim 1, characterized in that combining and mixing is carried out with compaction in grinding units, rotating intensive mixers or compacting devices.

4. The process according to claim 1, characterized in that combining and mixing with compaction take place a) in rotating intensive mixers with an energy input of 10 to 500 $kW/m^3$ or b) in rotor beater, pin or grinding media mills or c) in a compacting machine.

5. The process according to claim 1, characterized in that the calcination is carried out in equipment whose product-facing surfaces are made of materials resistant to high temperatures and corrosion from basic lithium salts, which materials are a) carbon-based materials, selected from material-graphites and pure carbons with disordered graphite structure, or b) oxide ceramics or Ce-stabilized $ZrO_2$, or c) non-oxide ceramics or d) metallic materials containing chromium and/or aluminum.

6. The process according to claim 5, characterized in that the calcination is carried out in equipment whose product-facing surfaces are selected from metallic materials selected from high-temperature resistant Cr- and/or Al-containing nickel-based alloys, Ni- and Cr-containing austenitic steels, Low-Ni and/or Ni-free, Cr- and Al-containing ferritic steels or Cr-containing mixed austenitic-ferritic steels, wherein the chromium content of the metallic materials in the absence of Al (<0.1% by weight) is at least 15% by weight.

7. The process according to claim 5, characterized in that the metallic materials contain, in addition to chromium and aluminum, the elements niobium, titanium, tantalum and/or silicon, each in proportions of 0 to 10% by weight.

8. The process according to claim 5, characterized in that the metallic materials contain <2 wt. % molybdenum.

9. The process according to claim 5, characterized in that the metallic materials comprise high-temperature-resistant black or stainless steels which are provided with a Cr-containing metallic coating on the side facing the product, the chromium content in the coating being at least 10% by weight.

10. The process according to claim 9, characterized in that a thickness of the coating, determined by electron microscopy, is at least 5 μm.

11. The process according to claim 1, characterized in that the calcination is carried out under vacuum conditions comprising a negative pressure in a range between 0.01 and 50 mbar (1 to 5000 Pa), or under overflow conditions, whereby an overflowing gas or gas mixture is inert or substantially inert with respect to carbon at temperatures of >600° C.

12. The process according to claim 11, characterized in that the gas or the gas mixture comprises nitrogen, a noble gas or mixtures of inert gases.

13. The process according to claim 1, characterized in that the molar ratio of the lithium carbo-nate and the carbon is in the range 1:0.6 to 1:1.1.

14. The process according to claim 1, characterized in that the carbon comprises elemental carbons in powder form having a specific surface area (BET) of 10 to 1500 $m^2/g$, and a median primary particle size $D_5O$<1000 nm.

15. The process of claim 1, characterized in that the carbon comprises carbon powder having sulfur contents of <1000 ppm, and residual ash contents of <1000 ppm.

16. The process according to claim 1, characterized in that the ratio of the median particle sizes $D_{50}$ of a deagglomerated carbon powder to $Li_2CO_3$ is in the range between 1:50 to 1:20,000.

17. The process according to claim 1, characterized in that the calcination is carried out under moving bed conditions.

18. The process according to claim 1, characterized in that the produced lithium oxide is subjected to a decarbonizing purification step in which the produced lithium oxide is contacted with a gas stream comprising oxygen-containing gases or gas mixtures selected from $O_2$, $CO_2$, $H_2O$ or mixtures thereof, optionally mixed with further gases inert to carbon, at temperatures of at least 300° C.

19. The process according to claim 1, characterized in that the powdered elemental carbon used is unprilled carbon black.

* * * * *